US005872874A

United States Patent [19]
Natarajan

[11] Patent Number: 5,872,874
[45] Date of Patent: *Feb. 16, 1999

[54] METHOD AND APPARATUS FOR SCALING DOWN IMAGES THAT ARE PROVIDED IN A COMPRESSED DATA FORMAT

[75] Inventor: Balas K. Natarajan, Los Gatos, Calif.

[73] Assignee: Hewlett-Packard Company, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 427,918

[22] Filed: Apr. 26, 1995

[51] Int. Cl.$^6$ .................................................. G06T 3/40
[52] U.S. Cl. ............................................ 382/298; 382/235
[58] Field of Search ................................... 382/235, 298, 382/250, 232, 248, 280, 299, 300, 301; 358/451; 348/581; 345/127, 128, 130; 395/102, 139

[56] References Cited

U.S. PATENT DOCUMENTS

| | | | |
|---|---|---|---|
| 5,050,225 | 9/1991 | Itoh | 382/46 |
| 5,157,488 | 10/1992 | Pennebaker | 358/133 |
| 5,158,375 | 10/1992 | Reisch et al. | 358/432 |
| 5,377,023 | 12/1994 | Sano et al. | 358/451 |
| 5,379,122 | 1/1995 | Eschbach | 358/426 |
| 5,408,274 | 4/1995 | Chang et al. | 348/700 |
| 5,414,469 | 5/1995 | Gonzales et al. | 348/408 |
| 5,467,131 | 11/1995 | Bhaskaran et al. | 348/384 |
| 5,491,761 | 2/1996 | Kim | 282/251 |
| 5,710,873 | 1/1998 | Romano et al. | 395/115 |

OTHER PUBLICATIONS

Frank Ayres, Jr., Theory and Problems of Matrices, Schaum Publishing Co., 1962, p.p. 11–13.

Shih–Fu Chang and David G. Messerschmitt, "A New Approach to Decoding and Compositing Motion–Compensated DCT–Based Images", ICASSP'93, pp. V–421–V–424.

Chang, S–F, Chen, W. L.., & Messerschmitt, D. (1992). "Video Compositing in the DCT domain", IEEE Intern. Workshop on Visual Signal Processing and Communications, Raleigh, North Carolina, Sep. 1992.

Smith, B, (1994). "Fast Software Processing of Motion JPEG Video", Multimedia '94 Conference, Oct., 1994.

Chang, Shih–Fu et al., "Manipulation and Compositing of MC–DCT Compressed Video", IEEE Journal on Selected Areas in Communications, vol. 13, No. 1, pp. 1–11.

Ngan, King Ngi, et al., "Lowpass Filtering in the Cosine Transform Domain", ICC '80. 1980 International Conference on Communications, Seattle Washington, Jun. 8–12, 1980, pp. 31.7/1–5.

Lee, J. B. et al., "Transform Domain Filtering based on Pipelining Structure", IEEE Transactions on Signal Processing, Aug. 1992, vol. 40, No. 8, pp. 2061–2064.

Lee, Yoon Yung et al., "Video Post–Production with Compressed Images", SMPTE Journal, Feb. 1994, vol. 103, No. 2, pp. 76–84.

Chang, Shih–Fu, "New Algorithms for Processing Images in the Transform–Compressed Domain", Visual Communications and Image Processing '95, Taipei, Taiwan, May 24–26, 1995, vol. 2501, pp. 445–454.

Smith, Brian C. et al, "Algorithms for Manipulating Compressed Images", IEEE Computer Graphics and Applications, vo. 13, No. 5, Sep. 1993, pp. 34–42.

*Primary Examiner*—Leo H. Boudreau
*Assistant Examiner*—Brian P. Werner

[57] ABSTRACT

An efficient method and apparatus that operates directly upon compressed blocks of image data to transform them into compressed blocks of scaled image data. Decompression of the compressed blocks of scaled image data yields blocks of scaled image data, which are then used to display a scaled down version of an original image. The present invention is more computationally efficient than a previously known scaling method, which required that compressed blocks of image data be uncompressed prior to any scaling operations.

19 Claims, 4 Drawing Sheets

METHOD AND APPARATUS FOR SCALING DOWN IMAGES THAT ARE PROVIDED IN A COMPRESSED DATA FORMAT

FIELD OF THE INVENTION

The present invention generally relates to the field of image processing and more particularly relates to scaling down images that are provided in a compressed data format.

BACKGROUND OF THE INVENTION

Digital images and video are often transmitted and stored in a compressed data format, conforming to compression standards such as the MPEG and JPEG standards for motion and still images. Both of these standards utilize the discrete cosine transform (DCT) to compress eight by eight (8×8) blocks of image data. In this context, there often arises the need to scale down an image that is provided in a compressed data format in order to achieve a suitable image.

For example, where an image is to be sent in compressed data format to receivers of different computational and display capabilities, it is necessary to scale down the image to match the capabilities of each receiver. As another example, in multi-party video conferencing, an image of each conference participant is transmitted in compressed data format. Down-scaling is needed because the images are displayed together in a mosaic comprising a large image of the current speaker and smaller, scaled down, images of the other conference participants.

A previously known method for scaling down an image provided in a compressed data format includes: un-compressing the compressed blocks of image data, scaling down the blocks of image data to produce one or more blocks of scaled image data, and then compressing the blocks of scaled image data.

For example, given an image in a DCT compressed data format of four compressed 8×8 blocks of image data, scaling down the image by a factor of two using the previously known method requires: four 8×8 inverse discrete cosine transforms to un-compress the compressed blocks of image data, 192 add operations and 16 shift operations for bilinear interpolation to scale down the blocks of image data into one 8×8 block of scaled image data, and an 8×8 discrete cosine transform to compress the block of scaled image data. Since a full 8×8 discrete cosine transform (or its inverse) requires 80 multiply operations and 464 add operations, and since a multiply operation can be represented as 4 shift operations and 3 add operations, in this example the previously known scaling method requires a total of 5,276 operations, comprising 1,704 shifts and 3,572 adds. Such a large number of operations is computationally time consuming and is therefore expensive.

Because the previously known method must first decompress the compressed blocks of image data before any scaling operations, the previously known method is computationally inefficient. What is needed is an efficient method and apparatus that operates directly upon compressed blocks of image data to transform them into compressed blocks of scaled image data.

SUMMARY OF THE INVENTION

The present invention provides an efficient method and apparatus that operates directly upon compressed blocks of image data to transform them into compressed blocks of scaled image data. Decompression of the compressed blocks of scaled image data yields blocks of scaled image data, which are then used to display a scaled version of an original image. The present invention is more computationally efficient than a previously known scaling method, which required that compressed blocks of image data be decompressed prior to any scaling operations.

In some embodiments of the invention, blocks of image data representative of the original image are stored in a memory of a first computer, which compresses the blocks of image data. The first computer then multiplies each compressed block of image data by at least one transformation matrix so as to produce one or more compressed blocks of scaled image data and transmits them to a second computer. The second computer decompresses the compressed blocks of scaled image data to produce one or more blocks of scaled image data, which are then used to display the scaled down version of the original image on a display device coupled to the second computer. In other embodiments, initial compression of the original image, scaling, and decompression, are all performed on the same computer, so that no transmission of data between computers is needed. In yet additional embodiments, initial compression of the original image is performed on a first computer, while the scaling, and decompression are performed on the second computer.

Other aspects and advantages of the present invention will become apparent from the following detailed description, taken in conjunction with the accompanying drawings, illustrating by way of example the principles of the invention.

DETAILED DESCRIPTION OF PREFERRED EMBODIMENT

Figure 1:
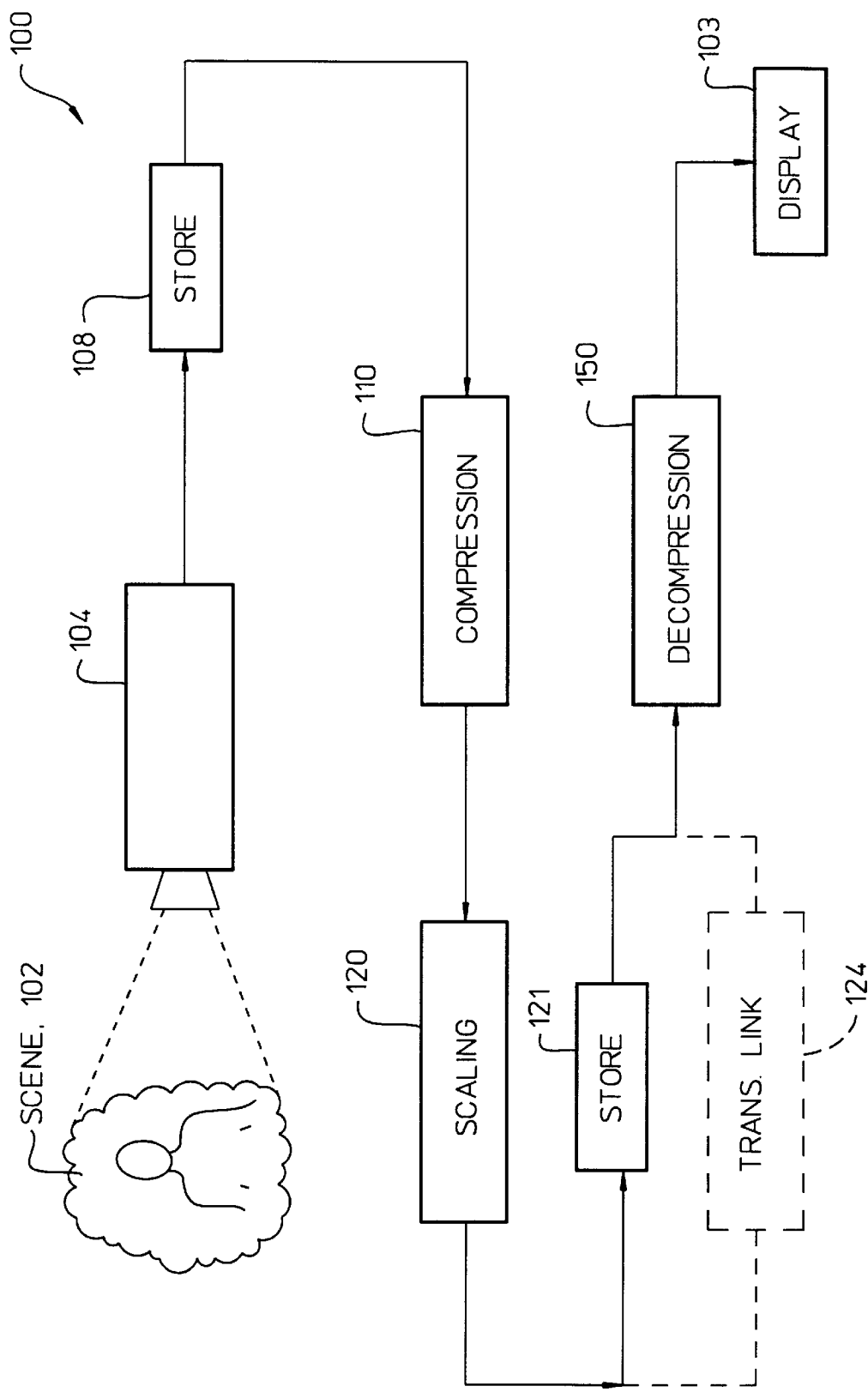
FIG. 1 is a schematic block diagram of an imaging system including components of the invention.
Figure 2:
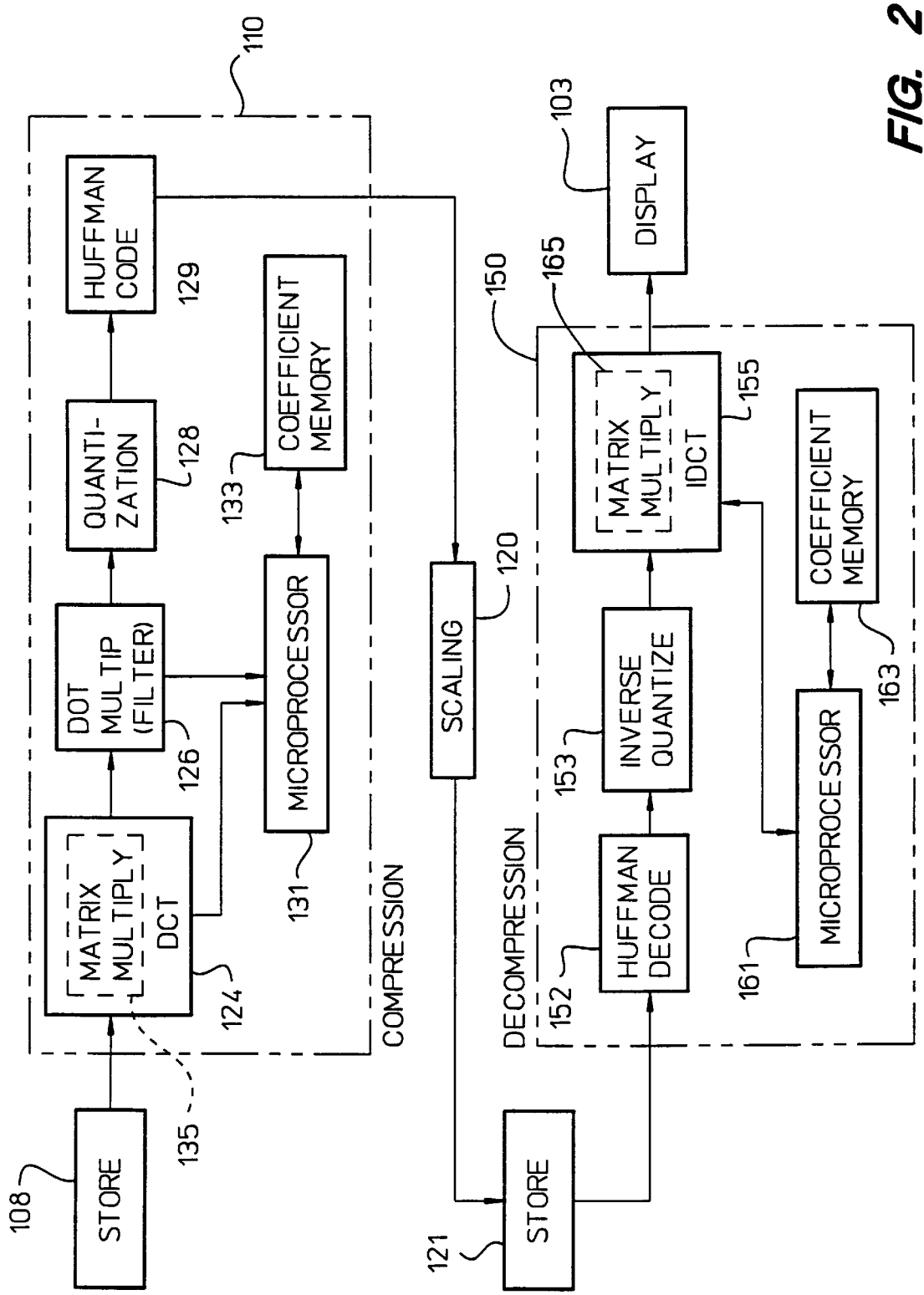
FIG. 2 is a schematic block diagram showing details of data compression, scaling, and data decompression of the invention.

FIGS. 1 and 2 together show a system 100 for presenting a scaled down version of an original scene image 102 upon a display 103. The display 103 is preferably a CRT (cathode ray tube) or LED (light-emitting diode) display. Data is gathered from the original image 102 by means of an image data source 104, preferably either an electronic camera having a photo-detector array of CCD (Charged Coupled Device) cells or an optical scanner, which are coupled with a storage unit 108, it being understood that the data may be obtained by a scanning of a photographic slide, as well as from an image produced by a television vidicon. In operation, individual photo-detector elements or cells detect rays of radiation emanating from the scene 102, the radiation being in the infrared or visible portion of the electromagnetic spectrum, by way of example. In the preferred embodiment, the CCD camera includes photo-detector cells arranged in a two dimensional array of rows and columns to permit a gathering of scene data.

The electronic camera 104 preferably includes an analog-to-digital converter which digitizes the analog signals of the photo-detector cells within the camera to provide blocks of data representative of the original image. The blocks of image data are outputted by the CCD camera and stored in a storage memory 108 of a first computer. The blocks of image data may be referred to as blocks of raw image data to distinguish the data from subsequent processing of the data.

Prior to the displaying of the data on the display 103, the blocks of raw image data are compressed by the first computer to provide compressed blocks of image data, which facilitate data storage and/or transmission. By way of example, in the practice of the preferred embodiment of the invention, the raw image data from the storage memory 108 is compressed by a JPEG (or MPEG) data compression section, or "data compressor" 110. The system further comprises a scaling section 120 that operates directly upon the compressed blocks of image data so as to produce one or more compressed blocks of scaled image data, prior to storage of the data in a subsequent storage memory 121.

It is noted that the invention can be practiced also with a transmission link 124, indicated in phantom, should it be desirable to transmit electronically data from the image data source 104 to a second computer coupled with the display 103, in which case the data compression would facilitate the transmission. The transmission link 124 may be a telephone circuit, a satellite communication link or other suitable form of communication system. In the preferred embodiment, the one or more compressed blocks of scaled image data are decompressed by the second computer to provide one or more blocks of scaled image data. For example, the system 100 further comprises a JPEG (or MPEG) data decompression section, or "data decompressor" 150 connected between an output of the storage memory 121 (or of the link 124) and the display 103.

Both the compression section and the decompression section are shown in greater detail in FIG. 2. The compression section 110 is preferably a JPEG compression system that includes a transformer 124 (FIG. 2) employing a forward discrete cosine transformation (DCT) to transform the blocks of image data into frequency components of the image. As shown, the preferred compression section further includes a dot multiplier 126 which operates to multiply the frequency components with a bandwidth limiting function, so as to provide a preferred digital filter which limits the bandwidth of the image data as it propagates through the compression section 110. The preferred compression section further includes a quantizer 128, which limits the number of bits per digital word describing the frequency components of the image, and a coder 129 which encodes the signal samples by means of a Huffman code for efficient transmission of the compressed blocks of image data through the compression section 110.

The compression section 110 further includes a first microprocessor 131, which essentially embodies the first computer. The first microprocessor is operative with a coefficient memory 133 for applying coefficients to a matrix multiplier 135 in circuitry of the transformer 124. The matrix multiplier 135 operates to multiply an array of digital quantities by an array of coefficients to provide matrix multiplication.

The scaling unit 120 of the invention operates with matrix multiplication. Accordingly, the scaling unit can be constructed as a stand-alone unit fully equipped with all necessary multiplication circuitry to perform its function or, alternatively, can share necessary multiplication and other computation circuitry already present in the JPEG (MPEG) compression or decompression sections 110, 150. The sharing of the elements of the compression section 110 with the scaling unit 120 is indicated by a dashed line. In the preferred embodiment, the first computer is used to multiply each compressed block of image data by at least one transformation matrix, so as to produce at least one compressed block of scaled image data.

The decompression section 150 is preferably a JPEG decompression system and includes many of similar basic components that present in the compression section 110. The selection of function of compression or decompression is accomplished by the use of software and an appropriate choice of transform coefficients for operating the forward or inverse DCT. The hardware of the compressor section 110 can alternatively be employed for also decompressing data stored in the storage memory 121 in preparation for presentation on the display, for example as in an alternative embodiment wherein the display 103 and the image source 104 are located at the same site. However, to facilitate the description of the invention, the compression section 110 and the decompression section 150 are shown separately.

The decompression section 150 comprises a decoder 152 which decodes the Huffman coding, an inverse quantizer 153 which employs multiplicative factors to restore the number of bits per digital word, and a transformer 155 providing an inverse discrete cosine transformation (IDCT). The decompression section 150 further includes a second microprocessor 161, which essentially embodies the second computer of the preferred embodiment. The second microprocessor is operative with a coefficient memory 163 for applying coefficients to a matrix multiplier 165 in circuitry of the transformer 155. Operating together, components of the decompression section operate upon the compressed blocks of scaled image data to produce the blocks of scaled image data.

The first microprocessor 131, by means of programming discussed in further detail subsequently herein employs the matrix multiplier 135 of the compression section to perform the DCT function for the JPEG compression, and the second microprocessor 161, by means of programming discussed in further detail subsequently herein employs the matrix multiplier 165 of the decompression section to perform the IDCT function for the JPEG decompression. By sharing necessary multiplication and other computation circuitry already present in the JPEG (MPEG) compression or decompression sections 110, 150, and by means of further programming, to be disclosed subsequently herein in accordance with the invention, the scaling section is enabled to operate in the performance of the scaling function.

In the preferred embodiment of the invention, the DCT is employed with blocks or arrays of image data points, such as an 8-by-8 array of 64 data points. The image data comprises a plurality of these blocks. For purposes of illustration only, operation of the invention will be discussed with respect to compression and scaling of four co-adjacent blocks, however it should be understood that the principles discussed herein are iteratively applicable to all of the image data blocks.

A first one of the blocks of image data, referred to herein as an $S_1$ matrix, is square and has 64 terms arranged in an 8-by-8 array of rows and columns. In accordance with principles of the invention, the $S_1$ matrix is deemed to be a sampling of a first region of the image at notional two dimensional grid positions 0.5, 1.5, 2.5, . . . , 7.5. Of course, in operation of the invention, terms of the $S_1$ matrix are numeric values. However in explaining theory of the operation of the invention, it is illustrative herein to use familiar function notation, so that the first block of the image data points are representatively illustrated as a first function, $f_1(x,y)$, of notional grid positions. Accordingly the elements of the $S_1$ matrix are interpreted as follows:

| $S_1 =$ | | | | | | | |
|---|---|---|---|---|---|---|---|
| $f_1(0.5,0.5)$ | $f_1(0.5,1.5)$ | $f_1(0.5,2.5)$ | $f_1(0.5,3.5)$ | $f_1(0.5,4.5)$ | $f_1(0.5,5.5)$ | $f_1(0.5,6.5)$ | $f_1(0.5,7.5)$ |
| $f_1(1.5,0.5)$ | $f_1(1.5,1.5)$ | $f_1(1.5,2.5)$ | $f_1(1.5,3.5)$ | $f_1(1.5,4.5)$ | $f_1(1.5,5.5)$ | $f_1(1.5,6.5)$ | $f_1(1.5,7.5)$ |
| $f_1(2.5,0.5)$ | $f_1(2.5,1.5)$ | $f_1(2.5,2.5)$ | $f_1(2.5,3.5)$ | $f_1(2.5,4.5)$ | $f_1(2.5\ 5.5)$ | $f_1(2.5,6.5)$ | $f_1(2.5,7.5)$ |
| $f_1(3.5,0.5)$ | $f_1(3.5,1.5)$ | $f_1(3.5,2.5)$ | $f_1(3.5,3.5)$ | $f_1(3.5,4.5)$ | $f_1(3.5,5.5)$ | $f_1(3.5,6.5)$ | $f_1(3.5,7.5)$ |
| $f_1(4.5,0.5)$ | $f_1(4.5,1.5)$ | $f_1(4.520.5)$ | $f_1(4.5,3.5)$ | $f_1(4.5,4.5)$ | $f_1(4.5,5.5)$ | $f_1(4.5,6.5)$ | $f_1(4.5,7.5)$ |
| $f_1(5.5,0.5)$ | $f_1(5.5,1.5)$ | $f_1(5.5,2.5)$ | $f_1(5.5,3.5)$ | $f_1(5.5,4.5)$ | $f_1(5.5,5.5)$ | $f_1(5.5,6.5)$ | $f_1(5.5,7.5)$ |
| $f_1(6.5,0.5)$ | $f_1(6.5,1.5)$ | $f_1(6.5,2.5)$ | $f_1(6.5,3.5)$ | $f_1(6.5,4.5)$ | $f_1(6.5,5.5)$ | $f_1(6.5,6.5)$ | $f_1(6.5,7.5)$ |
| $f_1(7.5,0.5)$ | $f_1(7.5,1.5)$ | $f_1(7.5,2.5)$ | $f_1(7.5,3.5)$ | $f_1(7.5,4.5)$ | $f_1(7.5,5.5)$ | $f_1(7.5,6.5)$ | $f_1(7.5,7.5)$ |

In addition to the first block of image data, three additional blocks of image data describing co-adjacent image regions provide four co-adjacent 8-by-8 blocks of image data, $S_1, S_2, S_3, S_4$, as shown in the following expanded matrix:

$$\begin{pmatrix} S_1 & S_2 \\ S_4 & S_3 \end{pmatrix}$$

Of course, in operation of the invention, terms of the each of the matrices $S_2$, $S_3$, $S_4$ are numeric values. However in explaining theory of the operation of the invention, it is once again illustrative herein to use familiar function notation. Terms of the second block of adjacent image data points, $S_2$, are representatively illustrated as a second function, $f_2(x,y)$, of additional notional grid positions, wherein the $S_2$ matrix is deemed to be a sampling of an adjacent second region of the image at notional two dimensional grid positions 0.5, 1.5, 2.5, ..., 7.5, as follows:

function, $f_4(X,Y)$ of yet additional notional grid positions, wherein the $S_4$ matrix is deemed to be a sampling of an adjacent fourth region of the image at the notional two dimensional grid positions 0.5, 1.5, 2.5 ..., 7.5, as follows:

| $S_2 =$ | | | | | | | |
|---|---|---|---|---|---|---|---|
| $f_2(0.5,0.5)$ | $f_2(0.5,1.5)$ | $f_2(0.5,2.5)$ | $f_2(0.5,3.5)$ | $f_2(0.5,4.5)$ | $f_2(0.5,5.5)$ | $f_2(0.5,6.5)$ | $f_2(0.5,7.5)$ |
| $f_2(1.5,0.5)$ | $f_2\ 1.5,1.5)$ | $f_2(1.5,2.5)$ | $f_2(1.5,3.5)$ | $f_2(1.5,4.5)$ | $f_2(1.5,5.5)$ | $f_2(1.5,6.5)$ | $f_2\ 1.5,7.5)$ |
| $f_2(2.5,0.5)$ | $f_2(2.5,1.5)$ | $f_2(2.5,2.5)$ | $f_2\ 2.5,3.5)$ | $f_2(2.5,4.5)$ | $f_2(2.5\ 5.5)$ | $f_2\ 2.5,6.5)$ | $f_2(2.5,7.5)$ |
| $f_2(3.5,0.5)$ | $f_2(3.5,1.5)$ | $f_2(3.5,2.5)$ | $f_2(3.5,3.5)$ | $f_2(3.5,4.5)$ | $f_2(3.5,5.5)$ | $f_2(3.5,6.5)$ | $f_2(3.5,7.5)$ |
| $f_2(4.5,0.5)$ | $f_2(4.5,1.5)$ | $f_2(4.520.5)$ | $f_2(4.5,3.5)$ | $f_2(4.5,4.5)$ | $f_2(4.5,5.5)$ | $f_2(4.5,6.5)$ | $f_2(4.5,7.5)$ |
| $f_2(5.5,0.5)$ | $f_2(5.5,1.5)$ | $f_2(5.5,2.5)$ | $f_2(5.5,3.5)$ | $f_2(5.5,4.5)$ | $f_2(5.5,5.5)$ | $f_2(5.5,6.5)$ | $f_2(5.5,7.5)$ |
| $f_2(6.5,0.5)$ | $f_2(6.5,1.5)$ | $f_2(6.5,2.5)$ | $f_2(6.5,3.5)$ | $f_2(6.5,4.5)$ | $f_2(6.5,5.5)$ | $f_2(6.5,6.5)$ | $f_2(6.5,7.5)$ |
| $f_2(7.5,0.5)$ | $f_2(7.5,1.5)$ | $f_2(7.5.2.5)$ | $f_2(7.5,3.5)$ | $f_2(7.5,4.5)$ | $f_2(7.5,5.5)$ | $f_2(7.5,6.5)$ | $f_2(7.5,7.5)$ |

Similarly, terms of the third block of adjacent image data points, $S_3$, are representatively illustrated as a third function, $f_3(x,y)$ of yet additional notional grid positions, wherein the $S_3$ matrix is deemed to be a sampling of an adjacent third region of the image at notional two dimensional grid positions 0.5, 1.5, 2.5, ..., 7.5, as follows:

| $S_3 =$ | | | | | | | |
|---|---|---|---|---|---|---|---|
| $f_3(0.5,0.5)$ | $f_3(0.5,1.5)$ | $f_3(0.5,2.5)$ | $f_3(0.5,3.5)$ | $f_3(0.5,4.5)$ | $f_3(0.5,5.5)$ | $f_3(0.5,6.5)$ | $f_3(0.5,7.5)$ |
| $f_3(1.5,0.5)$ | $f_3\ 1.5,1.5)$ | $f_3(1.5,2.5)$ | $f_3(1.5,3.5)$ | $f_3(1.5,4.5)$ | $f_3(1.5,5.5)$ | $f_3(1.5,6.5)$ | $f_3\ 1.5,7.5)$ |
| $f_3(2.5,0.5)$ | $f_3(2.5,1.5)$ | $f_3(2.5,2.5)$ | $f_3\ 2.5,3.5)$ | $f_3(2.5,4.5)$ | $f_3(2.5\ 5.5)$ | $f_3\ 2.5,6.5)$ | $f_3(2.5,7.5)$ |
| $f_2(3.5,0.5)$ | $f_2(3.5,1.5)$ | $f_2(3.5,2.5)$ | $f_2(3.5,3.5)$ | $f_2(3.5,5.5)$ | $f_2(3.5,5.5)$ | $f_2(3.5,6.5)$ | $f_2(3.5,7.5)$ |
| $f_3(4.5.0.5)$ | $f_3(4.5,1.5)$ | $f_3(4.520.5)$ | $f_3(4.5,3.5)$ | $f_3(4.5,4.5)$ | $f_3(4.5,5.5)$ | $f_3(4.5,6.5)$ | $f_3(4.5,7.5)$ |
| $f_3(5.5,0.5)$ | $f_3(5.5,1.5)$ | $f_3(5.5,2.5)$ | $f_3(5.5,3.5)$ | $f_3(5.5,4.5)$ | $f_3(5.5,5.5)$ | $f_3(5.5,6.5)$ | $f_3(5.5,7.5)$ |
| $f_3(6.5,0.5)$ | $f_3(6.5,1.5)$ | $f_3(6.5,2.5)$ | $f_3(6.5,3.5)$ | $f_3(6.5,4.5)$ | $f_3(6.5,5.5)$ | $f_3(6.5,6.5)$ | $f_3(6.5,7.5)$ |
| $f_3(7.5,0.5)$ | $f_3(7.5,1.5)$ | $f_3(7.5,2.5)$ | $f_3(7.5,3.5)$ | $f_3(7.5,4.5)$ | $f_3(7.5,5.5)$ | $f_3(7.5,6.5)$ | $f_3(7.5,7.5)$ |

Similarly, terms of the fourth block of adjacent image data points, $S_4$, are representatively illustrated as a fourth

| $S_4 =$ | | | | | | | |
|---|---|---|---|---|---|---|---|
| $f_4(0.5,0.5)$ | $f_4(0.5,1.5)$ | $f_4(0.5,2.5)$ | $f_4(0.5,3.5)$ | $f_4(0.5,4.5)$ | $f_4(0.5,5.5)$ | $f_4(0.5,6.5)$ | $f_4(0.5,7.5)$ |
| $f_4(1.5,0.5)$ | $f_4\,1.5,1.5)$ | $f_4(1.5,2.5)$ | $f_4(1.5,3.5)$ | $f_4(1.5,4.5)$ | $f_4(1.5,5.5)$ | $f_4(1.5,6.5)$ | $f_4\,1.5.7.5)$ |
| $f_4(2.5,0.5)$ | $f_4(2.5,1.5)$ | $f_4(2.5,2.5)$ | $f_4\,2.5,3.5)$ | $f_4(2.5,4.5)$ | $f_4(2.5\,5.5)$ | $f_4\,2.5,6.5)$ | $f_4(2.5,7.5)$ |
| $f_4(3.5,0.5)$ | $f_4(3.5,1.5)$ | $f_4(3.5,2.5)$ | $f_4(3.5,3.5)$ | $f_4(3.5,4.5)$ | $f_4(3.5,5.5)$ | $f_4(3.5,6.5)$ | $f_4(3.5,7.5)$ |
| $f_4(4.5,0.5)$ | $f_4(4.5,1.5)$ | $f_4(4.520.5)$ | $f_4(4.5,3.5)$ | $f_4(4.5,4.5)$ | $f_4(4.5,5.5)$ | $f_4(4.5,6.5)$ | $f_4(4.5,7.5)$ |
| $f_4(5.5,0.5)$ | $f_4(5.5,2.5)$ | $f_4(5.5,2.5)$ | $f_4(5.5,3.5)$ | $f_4(5.5,4.5)$ | $f_4(5.5,5.5)$ | $f_4(5.5,6.5)$ | $f_4(5.5,7.5)$ |
| $f_4(6.5,0.5)$ | $f_4(6.5,1.5)$ | $f_4(6.5,2.5)$ | $f_4(6.5,3.5)$ | $f_4(6.5,4.5)$ | $f_4(6.5,5.5)$ | $f_4(6.5,6.5)$ | $f_4(6.5,7.5)$ |
| $f_4(7.5,0.5)$ | $f_4(7.5,1.5)$ | $f_4(7.5,2.5)$ | $f_4(7.5,3.5)$ | $f_4(7.5,4.5)$ | $f_4(7.5,5.5)$ | $f_4(7.5,6.5)$ | $f_4(7.5,7.5)$ |

Figure 3A:
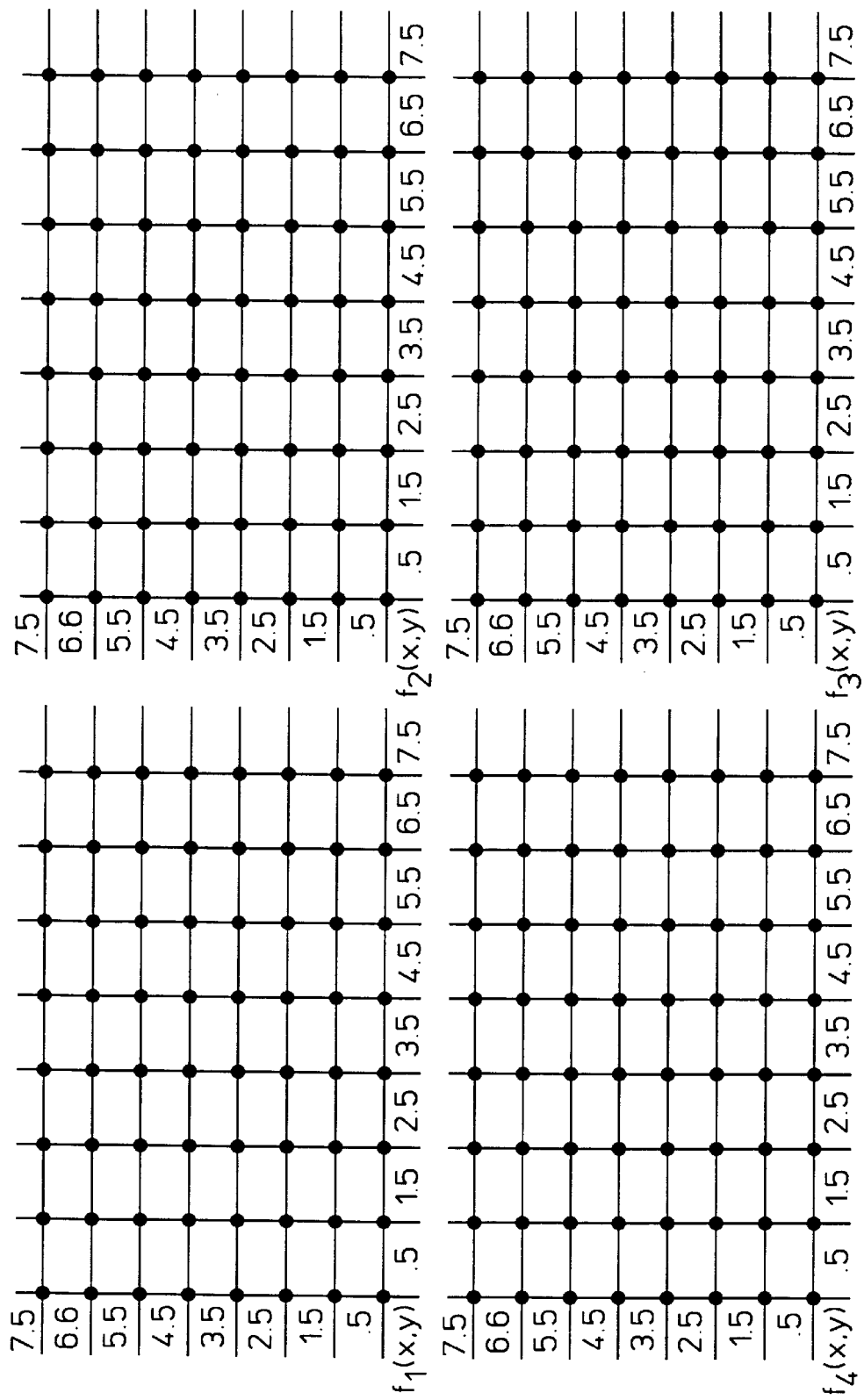
FIG. 3A is a diagram illustrating sampling of four co-adjacent image regions, in accordance with the preferred embodiment of the invention, as four image functions of notional grid locations.

FIG. 3A is a diagram illustrating the sampling of the four co-adjacent image regions as four image functions of notional grid locations.

A knowledge of the mathematical basis of the invention is useful for understanding the invention. In the preferred embodiment the Discrete Cosine Transform, DCT, is used to compress the blocks of image data. The DCT behaves better at interfaces and introduces much smaller discontinuities at such interfaces than do alternative techniques such as the FFT (fast Fourier transform). The DCT may be understood by considering the processing of a block of data points at positions $0 \leq X \leq L$ in a region extending over a distance L by the DCT. The region X/L extends over pi radians in the kernel of the DCT. In the case of the region of the DCT, the mathematical terms are real only. There are only a magnitude and a sign which is negative or positive; there is no phase angle.

In the DCT of the present invention, there are frequency components at $0, 1, 2, 3 \ldots N-1$ cycles. In forming the DCT of a block of data points, the number of frequency terms in the DCT is equal to the number of data terms.

The one dimensional DCT, $D=\{d_i\}$, of an n point sequence $s=\{s_i\}$ for $0 \leq i \leq (N-1)$ is given by the vector equation $D=AS$ where the transform matrix $A=\{a_{ij}\}$ is given by:

$$a_{ij} = \sqrt{\frac{2}{N}}\; c(j)\cos\left[\frac{(2i+1)}{2N}\, j\pi\right]$$

where $i,j=0, 1, \ldots N-1$ $c(j)=1\sqrt{2}$ for $j-0$ and $c(j)=1$ for $j=1, \ldots N-1$.

In the JPEG compression system it is the practice to use blocks of data in 8-by-8 arrays of data points. There is a corresponding DCT coefficient matrix, A, which is an 8-by-8 arrays of coefficients. The JPEG circuitry is designed for processing 8-by-8 arrays of data and coefficients with matrix multiplication. To take advantage of existing circuitry, it is desirable, where possible, to practice the invention by use of the 8-by-8 array circuitry already in place in the JPEG compression system.

To facilitate explanation of the processes employed in practicing the invention, it is useful to review certain mathematical operations with matrices. For simplicity in explaining a DCT transformation operation, consider a block of image data expressed as an 8-by-8 array of pixels.

The A matrix-is used to convert an array of image data points, as set forth in the S matrix, to an array of frequency points of the DCT, as set forth in a D matrix, by multiplying the S matrix by the A matrix to get terms of the cosine transform which are set forth in the D matrix. In accordance with well-known matrix multiplication, the frequency components of the two-dimensional DCT, D, are expressed in matrix notation $D=ASA^T$, wherein transposition of the A matrix, $A^T$, is attained by flipping the matrix over about its diagonal which extends from the upper left corner to the lower right corner.

Similarly, the Discrete Cosine Transform provides four co-adjacent 8-by-8 blocks of frequency points $D_1$, $D_2$, $D_3$, $D_4$, from the four co-adjacent 8-by-8 blocks of image data, $S_1$, $S_2$, $S_3$, $S_4$, which are transformed using matrix multiplication with the A matrix and $A^T$ matrix, as described by the following equation:

$$\begin{pmatrix} D_1 & D_2 \\ D_4 & D_3 \end{pmatrix} = \begin{pmatrix} A & A \\ A & A \end{pmatrix} \begin{pmatrix} S_1 & S_2 \\ S_4 & S_3 \end{pmatrix} \begin{pmatrix} A^T & A^T \\ A^T & A^T \end{pmatrix}$$

The present invention provides a method and apparatus that operates directly upon compressed blocks of image data to transform them into compressed blocks of scaled image data. For example, in the preferred embodiment, the method and apparatus of the invention operates directly upon the four co-adjacent 8-by-8 blocks of frequency points $D_1$, $D_2$, $D_3$, $D_4$ to produce one compressed 8-by-8 block of scaled image data, E, using the following equation:

$$E = (G\,H) \begin{pmatrix} D_1 & D_2 \\ D_4 & D_3 \end{pmatrix} \begin{pmatrix} G^T \\ H^T \end{pmatrix}$$

where the compressed image data is scaled using matrix multiplication by transformation matrices, G, H, $G^T$, $H^T$, having terms of magnitude substantially equal to only either zero, one eighth, one fourth, or one half. In the preferred embodiment, the four transformation matrices are substantially similar. The G and H transformation matrices differ only by sign of the terms. The only difference between the G and $G^T$ matrices, and between the H and $H^T$ is transposed term ordering. In the preferred embodiment, the initial transformation matrix G has terms as follows:

| $G =$ | | | | | | | |
|---|---|---|---|---|---|---|---|
| ½ | 0 | 0 | 0 | 0 | 0 | 0 | 0 |
| ½ | ¼ | 0 | 0 | 0 | 0 | 0 | −¼ |
| 0 | ½ | 0 | 0 | 0 | 0 | 0 | −½ |
| −⅛ | ½ | ¼ | 0 | 0 | 0 | −¼ | −½ |
| 0 | 0 | ½ | 0 | 0 | 0 | −½ | 0 |
| ⅛ | −¼ | ½ | ¼ | 0 | −¼ | −½ | ¼ |
| 0 | 0 | 0 | ½ | 0 | −½ | 0 | 0 |
| −⅛ | ⅛ | −¼ | ½ | 0 | −½ | ¼ | −⅛ |

Similarly the second transformation matrix H has terms as follows:

| $H =$ | | | | | | | |
|---|---|---|---|---|---|---|---|
| ½ | 0 | 0 | 0 | 0 | 0 | 0 | 0 |
| −½ | ¼ | 0 | 0 | 0 | 0 | 0 | −¼ |
| 0 | −½ | 0 | 0 | 0 | 0 | 0 | ½ |
| ⅛ | ½ | −¼ | 0 | 0 | 0 | ¼ | −½ |

-continued $$H = \begin{pmatrix} 0 & 0 & \frac{1}{2} & 0 & 0 & 0 & -\frac{1}{2} & 0 \\ -\frac{1}{8} & -\frac{1}{4} & -\frac{1}{2} & \frac{1}{4} & 0 & -\frac{1}{4} & \frac{1}{2} & \frac{1}{4} \\ 0 & 0 & 0 & -\frac{1}{2} & 0 & \frac{1}{2} & 0 & 0 \\ \frac{1}{8} & \frac{1}{8} & \frac{1}{4} & \frac{1}{2} & 0 & -\frac{1}{2} & -\frac{1}{4} & -\frac{1}{8} \end{pmatrix}$$

Figure 3B:
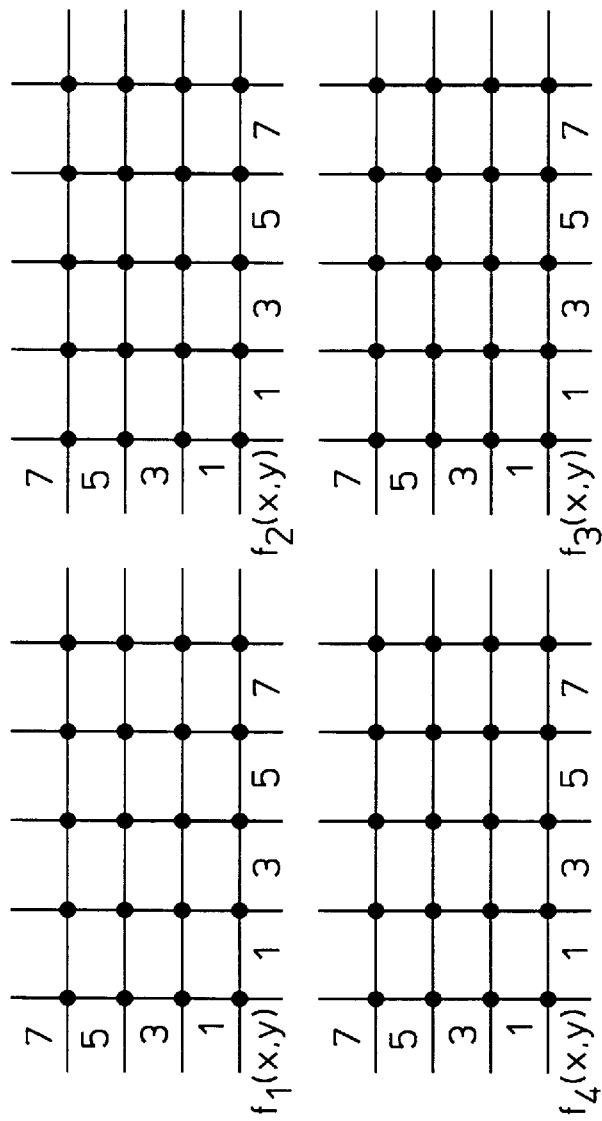
FIG. 3B is a diagram illustrating sampling of the four co-adjacent image regions, in accordance with the preferred embodiment of the invention, as four image functions of notional grid locations having a reduced scale, relative to those shown in FIG. 3A.

Decompression of the compressed blocks of scaled image data yields blocks of scaled image data, which are then used to display a scaled version of the original image. In the preferred embodiment, the scaled version corresponds to the original image scaled down by a factor of two. For example, in the preferred embodiment, the Inverse Discrete Cosine Transform, IDCT, is used to perform the decompression of the compressed 8-by-8 block of scaled image data, E, to yield an 8-by-8 block of scaled image data, B, using the following equation:

$$B = A^{-1} E (A^{-1})^T$$

where $A^{-1}$ is the inverse of A, and $(A^{-1})^T$ is the transpose of the inverse of A. In accordance with principles of the invention, the B matrix is the single 8-by-8 data block having terms approximately equal a sampling of the image at reduced scale notional two dimensional grid positions 1, 3, 5, and 7 of each of the four adjacent image regions, so as to provide a scaled version of the image as described by the original four 8-by-8 data blocks. Of course, in operation of the invention, terms of the B matrix are numeric values. However in explaining theory of the operation of the invention, it is once again illustrative herein to use the familiar function notation. Accordingly, the image data points of the first data block are representatively illustrated in a diagram of FIG. 3B as four image functions, $f_1$, $f_2$, $f_3$, $f_4$, of notional grid positions, which have a reduced scale relative to those shown in FIG. 3A. The resulting matrix B is approximately equal to:

| $f_1(1,1)$ | $f_1(1,3)$ | $f_1(1,5)$ | $f_1(1,7)$ | $f_2(1,1)$ | $f_2(1,3)$ | $f_2(1,5)$ | $f_2(1,7)$ |
|---|---|---|---|---|---|---|---|
| $f_1(3,1)$ | $f_1(3,3)$ | $f_1(3,5)$ | $f_1(3,7)$ | $f_2(3,1)$ | $f_2(3,3)$ | $f_2(3,5)$ | $f_2(3,7)$ |
| $f_1(5,1)$ | $f_1(5,3)$ | $f_1(5,5)$ | $f_1(5,7)$ | $f_2(5,1)$ | $f_2(5,3)$ | $f_2(5,5)$ | $f_2(5,7)$ |
| $f_1(7,1)$ | $f_1(7,3)$ | $f_1(7,5)$ | $f_1(7,7)$ | $f_2(7,1)$ | $f_2(7,3)$ | $f_2(7,5)$ | $f_2(7,7)$ |
| $f_4(1,1)$ | $f_4(1,3)$ | $f_4(1,5)$ | $f_4(1,7)$ | $f_3(1,1)$ | $f_3(1,3)$ | $f_3(1,5)$ | $f_3(1,7)$ |
| $f_4(3,1)$ | $f_4(3,3)$ | $f_4(3,5)$ | $f_4(1,7)$ | $f_3(3,1)$ | $f_3(3,3)$ | $f_3(3,5)$ | $f_3(3,7)$ |
| $f_4(5,1)$ | $f_4(5,3)$ | $f_4(5,5)$ | $f_4(4,7)$ | $f_3(5,1)$ | $f_3(5,3)$ | $f_3(5,5)$ | $f_3(5,7)$ |
| $f_4(7,1)$ | $f_4(7,3)$ | $f_4(7,5)$ | $f_4(7,7)$ | $f_3(7,1)$ | $f_3(7,3)$ | $f_3(7,5)$ | $f_3(7,7)$ |

The present invention is more computationally efficient than a previously known scaling method, which required that compressed blocks of image data be decompressed prior to any scaling operations. It should be particularly noted that divisions by even numbers are advantageously effected by shift operations. A preferred method for matrix multiplication in performing the image scaling of the present invention is discussed in detail in a subsequent appendix. Accordingly, the scaling operation of the preferred embodiment of the invention is achieved using approximately 184 shifts and 696 adds, for a total of 880 operation. For sake of comparison, 5,276 operation are needed by the prior art discussed previously herein, in the background section. Accordingly, the invention provides a relative computational savings of approximately 83%.

The present invention provides an efficient method and apparatus that operates directly upon compressed blocks of image data to transform them into compressed blocks of scaled image data. Although specific embodiments of the invention have been described and illustrated, the invention is not to be limited to the specific forms or arrangements of parts so described and illustrated, and various modifications and changes can be made without departing from the scope and spirit of the invention. Within the scope of the appended claims, therefore, the invention may be practiced otherwise than as specifically described and illustrated.

APPENDIX

A preferred method for matrix multiplication in performing the image scaling of the present invention is discussed in detail in this appendix. The present invention provides a method and apparatus that operates directly upon compressed blocks of image data to transform them into compressed blocks of scaled image data. For example, in the preferred embodiment, the method and apparatus of the invention operates directly upon the four co-adjacent 8-by-8 blocks of frequency points $D_1$, $D_2$, $D_3$, $D_4$ to produce one compressed 8-by-8 block of scaled image data, E, using the following equation (1):

$$E = (G\ H) \begin{pmatrix} D_1 & D_2 \\ D_4 & D_3 \end{pmatrix} \begin{pmatrix} G^T \\ H^T \end{pmatrix} \quad (1)$$

where the compressed image data is scaled using matrix multiplication by transformation matrices, G, H, $G^T$, $H^T$, having terms of magnitude substantially equal to only either zero, one eighth, one fourth, or one half. Divisions by even numbers are advantageously effected by shift operations.

Let $\hat{G} = 2G$ and $= 2H$. Decompose equation (1) as follows, using the intermediate variables $Z_1$ and $Z_2$ in $R^{8 \times 8}$.

$$Z_1 = (\hat{G}) \begin{pmatrix} A_1 \\ A_4 \end{pmatrix}, \quad (2)$$

and

-continued $$Z_2 = (\hat{G}) \begin{pmatrix} A_2 \\ A_3 \end{pmatrix} \quad (3)$$

We then have equation (4):

$$E^T = 1/4(\hat{G}) \begin{pmatrix} Z_1 \\ Z_2 \end{pmatrix} \quad (4)$$

We have thus decomposed the matrix multiplication of equation (1) into three computations, each of the form:

$$W = (\hat{G}) \begin{pmatrix} X \\ Y \end{pmatrix} \quad (5)$$

We now show how (5) may be computed efficiently when G and H are as mentioned earlier, comprising of entries with magnitudes 0, ½, ¼ and ⅛. Under such an approximation, $\hat{G}$ and comprise of entries with magnitudes 0, 1, ½ and ¼. With these values in mind, the following method specifies the calculation of the elements of W from the elements of X and Y as given by (5). In the following $\alpha$ and $\beta$ are intermediate variables.

```
for j = 1, 2, . . . 8 do
    α_1j=x_1j;
    α_3j=x_2j-x_8j;
    α_5j=x_3j-x_7j;
    α_4j=α_3j;
    α_7j=x_4j-x_6j;
    β_1j=y_1j;
    β_3j=-y_2j-y_8j;
    β_5j=y_3j-y_7j;
    β_4j=-β_3j;
    β_7j=-(y_2j-y_6j);
    γ=(α_5j-β_5j)/2;
    δ=(x_1j-y_1j)/4
    w_1j=α_1j+β_1j;
    w_2j=α_1j-β_1j+(α_3j-β_3j)/2
    w_3j=α_3j+β_3j;
    w_4j=α_4j+β_4j+γ-δ;
    w_5j=α_5j+β_5j;
    w_6j=α_5j-β_5j+(α_7j-α_3j-β_7j+β_3j)/2+δ;
    w_7j=α_7j+β_7j;
    w_8j=α_7j-β_7j+(α_3j-β_3j)/4-γ-δ;
end
```

What is claimed is:

1. An apparatus comprising:

a computer having a memory for storing blocks of data representative of an original image;

a data compressor for compressing blocks of image data to produce compressed data blocks; and matrix multiplying means coupled with the data compressor for multiplying co-adjacent compressed data blocks by a plurality of transformation matrices, so as to produce respective compressed blocks of size scaled image data, wherein all of the terms of the plurality of transformation matrices have magnitudes selected from only zero, one eighth, one fourth, and one half, and wherein correspondingly positioned terms of a first half of the plurality of transformation matrices all have identical magnitudes, but in some cases have opposite signs, and the second half of the transformation matrices have a transposed term ordering of the first half of the plurality of transfonnation matrices.

2. An apparatus as in claim 1 further comprising:

a data decompressor for decompressing said at least one compressed block of scaled image data to produce at least one block of scaled image data; and a display for using said at least one the block of scaled image data to display a scaled version of the original image.

3. The apparatus of claim 1, wherein:

each of the compressed data blocks produced by the data compressor has 64 terms, arranged in an 8 by 8 matrix; and each of the plurality of transformation matrices used by the matrix multiplying means has 64 terms, arranged in an 8 by 8 matrix.

4. The apparatus of claim 1, wherein:

the apparatus functions to scale the image data by a factor of n; and the groups of the co-adjacent compressed blocks of image data are each composed of $n^2$ co-adjacent compressed blocks of the image data.

5. The apparatus of claim 4, wherein the matrix multiplying means is configured to multiply groups of co-adjacent compressed blocks of the image data by n transformation matrices and by transposes of such n transformation matrices, to produce for each group a single compressed block of scaled image data.

6. The apparatus of claim 5, wherein:

n is 2; and the n transformation matrices are as follows:

| First Transformation Matrix | | | | | | | |
|---|---|---|---|---|---|---|---|
| ½ | 0 | 0 | 0 | 0 | 0 | 0 | 0 |
| ½ | ¼ | 0 | 0 | 0 | 0 | 0 | -¼ |
| 0 | ½ | 0 | 0 | 0 | 0 | 0 | -½ |
| -⅛ | ½ | ¼ | 0 | 0 | 0 | -¼ | -½ |
| 0 | 0 | ½ | 0 | 0 | 0 | -½ | 0 |
| ½ | 0 | 0 | 0 | 0 | 0 | 0 | 0 |
| ⅛ | -¼ | ½ | ¼ | 0 | -¼ | -½ | ¼ |
| 0 | 0 | 0 | ½ | 0 | -½ | 0 | 0 |
| -⅛ | ⅛ | -¼ | ½ | 0 | -½ | ¼ | -⅛ |

| Second Transformation Matrix | | | | | | | |
|---|---|---|---|---|---|---|---|
| ½ | 0 | 0 | 0 | 0 | 0 | 0 | 0 |
| -½ | ¼ | 0 | 0 | 0 | 0 | 0 | -¼ |
| 0 | -½ | 0 | 0 | 0 | 0 | 0 | ½ |
| ⅛ | ½ | -¼ | 0 | 0 | 0 | ¼ | -½ |
| 0 | 0 | ½ | 0 | 0 | 0 | -½ | 0 |
| -⅛ | -¼ | -½ | ¼ | 0 | -¼ | ½ | ¼ |
| 0 | 0 | 0 | -½ | 0 | ½ | 0 | 0 |
| ⅛ | ⅛ | ¼ | ½ | 0 | -½ | -¼ | -⅛. |

7. The apparatus of claim 1, wherein the terms of each of the transformation matrices collectively have magnitudes of zero, one eighth, one fourth, and one half.

8. A method for scaling compressed blocks of image data, the method comprising:

receiving the blocks of compressed image data, the compressed image data representing an original image; and multiplying groups of co-adjacent compressed blocks of the image data by a plurality of transformation matrices, to produce respective compressed blocks of size scaled image data, wherein all of the terms of the plurality of transformation matrices have magnitudes selected from only zero, one eighth, one forth, and one half, and wherein correspondingly positioned terms of a first half of the plurality of transformation matrices all have identical magnitudes, but in some cases have opposite signs, and the second half of the transformation matrices have a transposed term ordering of the first half of the plurality of transformation matrices.

9. The method of claim 8, in which the terms of each of the transformation matrices collectively have magnitudes of zero, one-eighth, one-fourth and one half.

10. The method of claim 8, in which:

the method is for scaling the image data by a factor of n; and the groups of the co-adjacent compressed blocks of image data are each composed of $n^2$ co-adjacent compressed blocks of the image data.

11. The method of claim 10, in which the terms of each of the transformation matrices collectively have magnitudes of zero, one-eighth, one-fourth and one half.

12. The method of claim 10, wherein the step of multiplying includes a step of multiplying groups of co-adjacent compressed blocks of the image data by n transformation matrices and by transposes of such n transformation matrices, to produce for each group a single compressed block of scaled image data.

13. The method of claim 12, wherein:

n is 2; and the n transformation matrices are as follows:

First Transformation Matrix

| | | | | | | | |
|---|---|---|---|---|---|---|---|
| ½ | 0 | 0 | 0 | 0 | 0 | 0 | 0 |
| ½ | ¼ | 0 | 0 | 0 | 0 | 0 | -¼ |
| 0 | ½ | 0 | 0 | 0 | 0 | 0 | -½ |
| -⅛ | ½ | ¼ | 0 | 0 | 0 | -¼ | -½ |
| 0 | 0 | ½ | 0 | 0 | 0 | -½ | 0 |
| ⅛ | -¼ | ½ | ¼ | 0 | -¼ | -½ | ¼ |
| 0 | 0 | 0 | ½ | 0 | -½ | 0 | 0 |
| -⅛ | ⅛ | -¼ | ½ | 0 | -½ | ¼ | -⅛ |

Second Transformation Matrix

| | | | | | | | |
|---|---|---|---|---|---|---|---|
| ½ | 0 | 0 | 0 | 0 | 0 | 0 | 0 |
| -½ | ¼ | 0 | 0 | 0 | 0 | 0 | -¼ |
| 0 | -½ | 0 | 0 | 0 | 0 | 0 | ½ |
| ⅛ | ½ | -¼ | 0 | 0 | 0 | ¼ | -½ |
| ½ | 0 | 0 | 0 | 0 | 0 | 0 | 0 |
| 0 | 0 | ½ | 0 | 0 | 0 | -½ | 0 |
| -⅛ | -¼ | -½ | ¼ | 0 | -¼ | ½ | ¼ |
| 0 | 0 | 0 | -½ | 0 | ½ | 0 | 0 |
| ⅛ | ⅛ | ¼ | ½ | 0 | -½ | -¼ | -⅛. |

14. The method of claim 8, additionally comprising:

decompressing the compressed blocks of scaled image data to produce respective blocks of scaled image data; and displaying a scaled version of the original image in response to the blocks of scaled image data.

15. The method of claim 14, in which the terms of each of the transformation matrices collectively have magnitudes of zero, one-eighth, one-fourth and one half.

16. The method of claim 14, in which:

the method is for scaling the image data by a factor of n; and the groups of the co-adjacent compressed blocks of image data are each composed of $n^2$ compressed blocks of the image data.

17. The method of claim 16, in which the terms of each of the transformation matrices collectively have magnitudes of zero, one-eighth, one-fourth and one half.

18. The method of claim 14, in which:

the method additionally comprises providing a first computer, a second computer, and a display coupled to the second computer;

receiving the blocks of compressed image data and multiplying groups of the co-adjacent compressed blocks of the image data are performed by the first computer;

the method additionally comprises transmitting the compressed blocks of scaled image data from the first computer to the second computer;

decompressing the compressed blocks of scaled image data is performed by the second computer; and displaying the scaled version of the original image is performed by the display.

19. The method of claim 8, wherein:

each of the blocks of compressed image data received in the step of receiving has 64 terms, arranged in an 8 by 8 matrix; and each of the plurality of transformation matrices used in the step of multiplying has 64 terms, arranged in an 8 by 8 matrix.

* * * * *